US012766062B2

(12) United States Patent
Russell

(10) Patent No.: US 12,766,062 B2
(45) **Date of Patent: *Oct. 20, 2026**

(54) SYSTEM AND METHOD FOR PRODUCING A CREMATION STONE

(71) Applicant: Peter Russell, Mt. Pleasant (NZ)

(72) Inventor: Peter Russell, Mt. Pleasant (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,217

(22) Filed: Feb. 10, 2025

(65) Prior Publication Data

US 2025/0177228 A1 Jun. 5, 2025

Related U.S. Application Data

(63) Continuation of application No. 18/226,244, filed on Jul. 25, 2023, now Pat. No. 12,220,360.

(60) Provisional application No. 63/392,479, filed on Jul. 26, 2022.

(51) Int. Cl.

| | |
|---|---|
| ***A61G 17/007*** | (2006.01) |
| ***A61G 17/08*** | (2006.01) |
| ***B28B 7/00*** | (2006.01) |
| ***E04H 13/00*** | (2006.01) |

(52) U.S. Cl.

CPC ........... *A61G 17/007* (2013.01); *A61G 17/08* (2013.01); *B28B 7/0002* (2013.01); *E04H 13/008* (2013.01)

(58) Field of Classification Search

CPC .... A61G 17/007; A61G 17/08; E04H 13/008; B28B 7/0002; B28B 7/00; B28B 1/08; B29C 39/02; C04B 2111/00956; C04B 28/04; C04B 28/02; C04B 26/28; C04B 26/22; C04B 18/10; C04B 7/02; C04B 9/02; C04B 24/38; C04B 40/0067; C04B 41/53

See application file for complete search history.

(56) References Cited

U.S. PATENT DOCUMENTS

| | | | | |
|---|---|---|---|---|
| 1,640,680 | A | 8/1927 | Vanderlaan | |
| 4,038,094 | A | 7/1977 | Bondi | |
| 5,016,330 | A | 5/1991 | Botsch | |
| 6,200,507 | B1 | 3/2001 | Dennis | |
| 6,382,111 | B1 | 5/2002 | Johahi | |
| 7,266,866 | B2 | 9/2007 | Vogel | |
| 10,905,616 | B2 | 2/2021 | Hatry | |
| D921,325 | S | 6/2021 | Crowe | |
| 11,364,169 | B2 | 6/2022 | Hatry | |
| 11,470,839 | B2 | 10/2022 | Rubenstein | |
| D1,101,349 | S * | 11/2025 | Russell | D99/17 |
| 12,583,023 | B2 * | 3/2026 | Crowe | A61G 17/08 |
| 2002/0025392 | A1 | 2/2002 | Yardley | |
| 2003/0154581 | A1 | 8/2003 | Jain | |

(Continued)

FOREIGN PATENT DOCUMENTS

| | | | |
|---|---|---|---|
| CN | 1060998 | A | 5/1992 |
| CN | 105060859 | A | 11/2015 |

(Continued)

*Primary Examiner* — William L Miller

(74) *Attorney, Agent, or Firm* — Todd Martin

(57) ABSTRACT

Disclosed is a method of producing a solid cremation stone. The method comprises grinding ashes from cremated animal remains; mixing the ashes with water and at least one binder in a predetermined ratio to produce a mixture; pouring the mixture into a mould; vibrating the mould to minimise bubbles; and drying the mixture while in the mould to produce the solid stone.

9 Claims, 8 Drawing Sheets

(56) References Cited

U.S. PATENT DOCUMENTS

| | | | | |
|---|---|---|---|---|
| 2009/0077779 | A1 | 3/2009 | Zimmerman et al. | |
| 2010/0143653 | A1 | 6/2010 | Cranham | |
| 2013/0152348 | A1 | 6/2013 | Taylor | |
| 2014/0013554 | A1 | 1/2014 | Hojaji | |
| 2014/0116296 | A1 | 5/2014 | Williams | |
| 2016/0250091 | A1 | 9/2016 | Bisson | |
| 2017/0254108 | A1 | 9/2017 | Armstrong | |
| 2019/0160710 | A1 | 5/2019 | Allison | |
| 2020/0383861 | A1 | 12/2020 | Storts | |
| 2021/0212877 | A1 | 7/2021 | Bisson | |
| 2022/0219211 | A1 | 7/2022 | Crowe | |
| 2023/0303439 | A1 | 9/2023 | Tottosi | |
| 2025/0025914 | A1* | 1/2025 | Weng | A61G 17/08 |
| 2025/0100882 | A1* | 3/2025 | Ko | C01B 25/18 |
| 2025/0347139 | A1* | 11/2025 | Berry | C04B 18/06 |

FOREIGN PATENT DOCUMENTS

| | | | | | |
|---|---|---|---|---|---|
| CN | 106431100 | A | | 2/2017 | |
| GB | 2621000 | A | * | 1/2024 | A61G 17/08 |

* cited by examiner

Outer two-piece circular box

SYSTEM AND METHOD FOR PRODUCING A CREMATION STONE

CROSS REFERENCE TO RELATED APPLICATIONS

This application is a continuation of U.S. application Ser. No. 18/226,244, filed Jul. 25, 2023; which claims the benefit of U.S. Provisional Application No. 63/392,479, filed Jul. 26, 2022, the entire contents of each being incorporated by reference herein.

FIELD OF THE INVENTION

The present disclosure relates to improvements in systems and methods for the production of a cremation stone.

BACKGROUND OF THE INVENTION

Cremation carriers exist as a keepsake to maintain the ashes/remains of a loved one nearby. The processes to create conventional carriers involve undue complexity, risk and costs. For example, many carriers are hollow so that ashes are inserted into the carrier. Where the carrier happens to be non-hollow, the process to create a non-hollow carrier is unduly complex, and often involves a heating process. Air bubbles form, leading to weakness in the carrying structure. Where such a weakened carrying structure is placed over the hearth of a homeowner's fireplace or placed in sunlight, temperature variances can lead to cracking and permanent fracture, even disintegration of the carrier. The breakage of the carrier can lead to mental distress of a person when they see a loved one's ashes in a damaged state or spread about in their home.

Accordingly, there exists a need to provide an improved method for producing a carrier, or cremation stone, that is easily transportable and reliably maintains ashes of a loved one therein, with minimal risk of breakage.

SUMMARY

The present disclosure in one preferred aspect provides for a method of producing a solid cremation stone. The method includes grinding ashes from cremated animal remains; mixing the ashes with water and one or more binding agents in a predetermined ratio to produce a mixture; pouring the mixture into a mould; vibrating the mould to minimize bubbles; and drying the mixture while in the mould to produce the solid stone having no deformities or cavities. It will be appreciated that humans are an "animal" in common scientific parlance.

In another preferred aspect, there is provided a cremation stone product produced by the above-mentioned method.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

It will be appreciated that reference herein to "preferred" or "preferably" is intended as exemplary only. The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the disclosure, examples of which are illustrated in the accompanying drawings.

Figure 1:
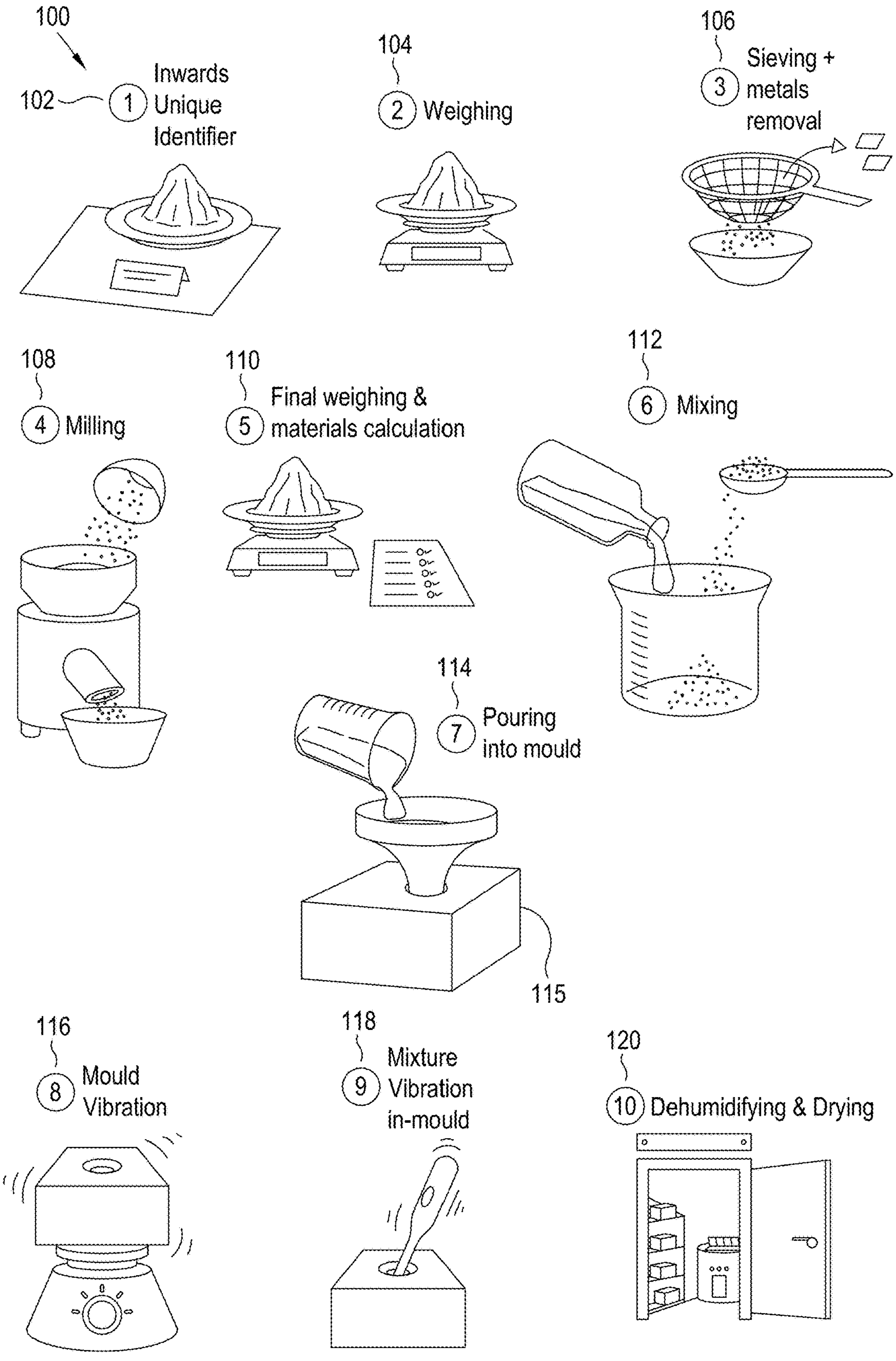
FIG. 1 is a flow diagram of a method of producing a cremation stone in accordance with a preferred embodiment of the present disclosure.
Figure 1:
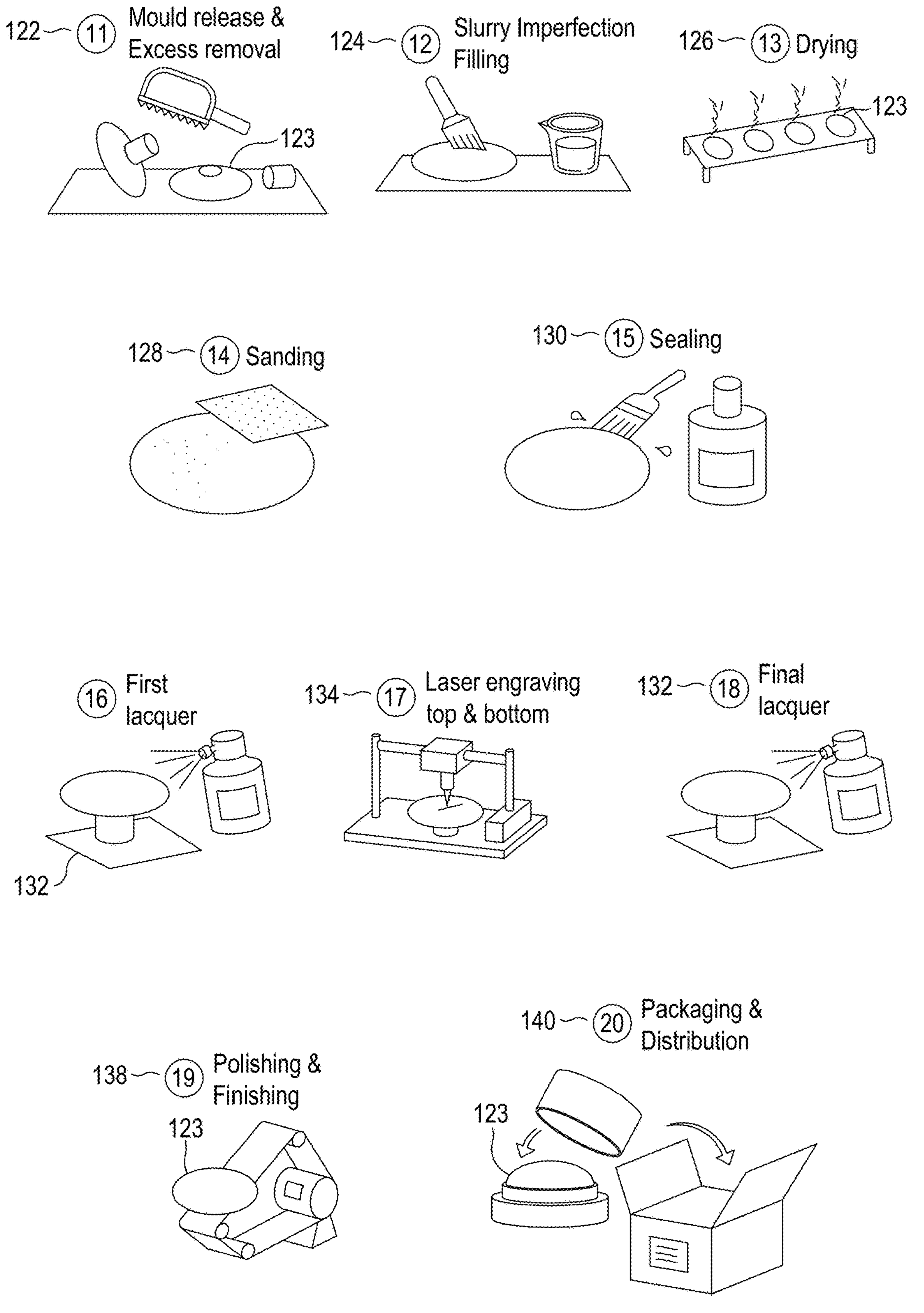

FIG. 1 shows a preferred method 100 for forming a carrier or cremation stone for transporting and/or maintaining the remains of a deceased loved one, whether a pet or human. Preferred steps of method 100 are described below.

In step 102, ashes (either human or non-human cremated remains) are received and preferably provided with a unique identifier job card. Thereafter, in step 104, the ashes are weighed and confirmed against an expected production order size. In step 106, the ashes are sieved to check for, and removal of foreign objects such as metals from surgeries, dental or other body implants, or jewellery. In a situation that involves pets, collars and/or tags are sieved.

In step 108, the ashes are milled, preferably using a stone-on-stone grinder to produce a preferably flour-like consistency of the resulting substance. Next, in step 110, the ashes are weighed again, and calculations made as to required proportions of accompanying constituents. Exemplary constituents include water, ashes, natural or synthetic fibres, and/or one or more biopolymers. Exemplary biopolymers may include one or more of calcium or sodium alginate; sorel cement ("magnesia" or magnesium oxide); silica; pozzolanic or white Portland cement.

Next, in step 112, the components are mixed into a toothpaste-like texture and consistency and prepared for solidification, which involves a densification, consolidation, hardening, and/or binding process of the mixed materials. In step 114, the mixture is poured into silicon a mould 115. Mould 115 is preferably constructed of a polymer, such as a flexible polymer that need not be heat-resistant since in a preferred embodiment, no heat is applied during the method. Where heat is envisioned during the method, mould 115 can be constructed from a suitable material such as a metal or carbon fibre as appropriate. In step 116, the mould is vibrated on a vibrating plate machine to remove air bubbles. In step 118, air bubbles are further removed by utilizing a stick vibrator 119 within the mixture. The moulds are placed in a dehumidifying and drying room for 2 to 4 days at a preferably constant 18 to 22 degrees C. in step 120.

In step 122, greenstate (still damp) stones 123 are released from the moulds. Excess material is removed via a saw and/or filling. In step 124, a slurry, optionally using the excess material removed in step 122, and water, is applied to stone 123 to fill imperfections. Thereafter, in step 126, stones 123 are dried at preferably room temperature (e.g., approximately 21 degrees C.) for preferably up to two days. Thereafter, the stone is sanded in step 128.

In step 130, stone 123 is sealed using natural stone and concrete sealer, and dried for a further 1-2 days at room temperature. Thereafter, a lacquer is sprayed over the stone over the course of up to 2 days in step 132. In step 134, stone 123 may be laser engraved or etched with a name and/or years of life of the person/animal within the stone. Next, in step 136, the stone receives a final lacquer coat over the course of the next 1-2 days. Thereafter, stone 123 is polished and inspected in step 138. Finally, each stone 123 is packaged and distributed, for example, by courier, in step 140.

It will be appreciated that the steps described above may be performed in a different order, varied, or some steps omitted entirely without departing from the scope of the present disclosure. For example, one or more of the lacquer, polishing and/or engraving steps may be omitted if desired.

Figure 2A:
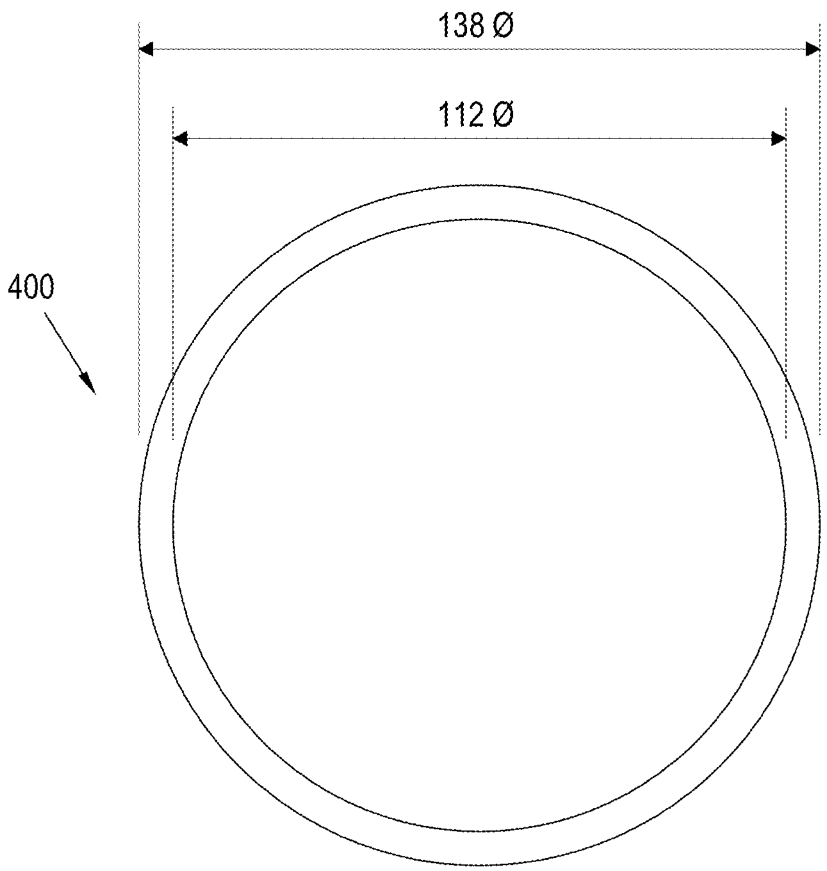
FIG. 2A is a top view of the wood plinth for carrying and display of a cremation stone produced by a method such as illustrated in FIG. 1.
Figure 2B:
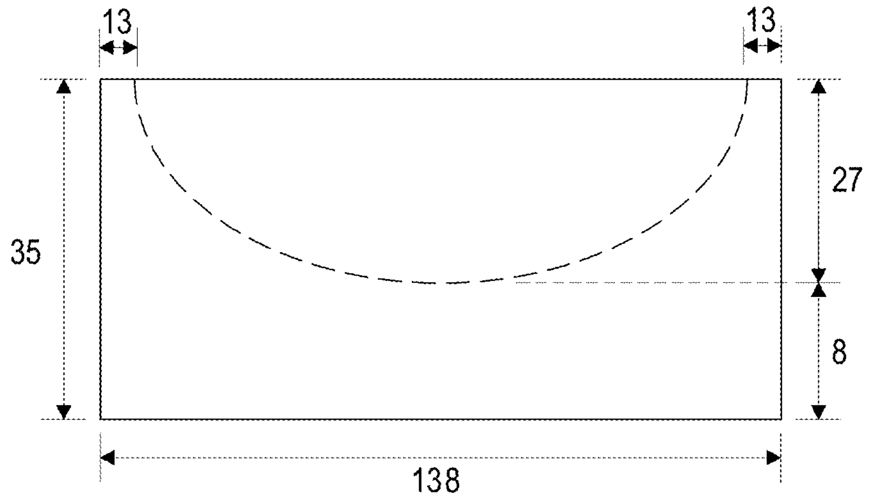
FIG. 2B is a side view of the wood plinth of FIG. 2A.
Figure 2C:
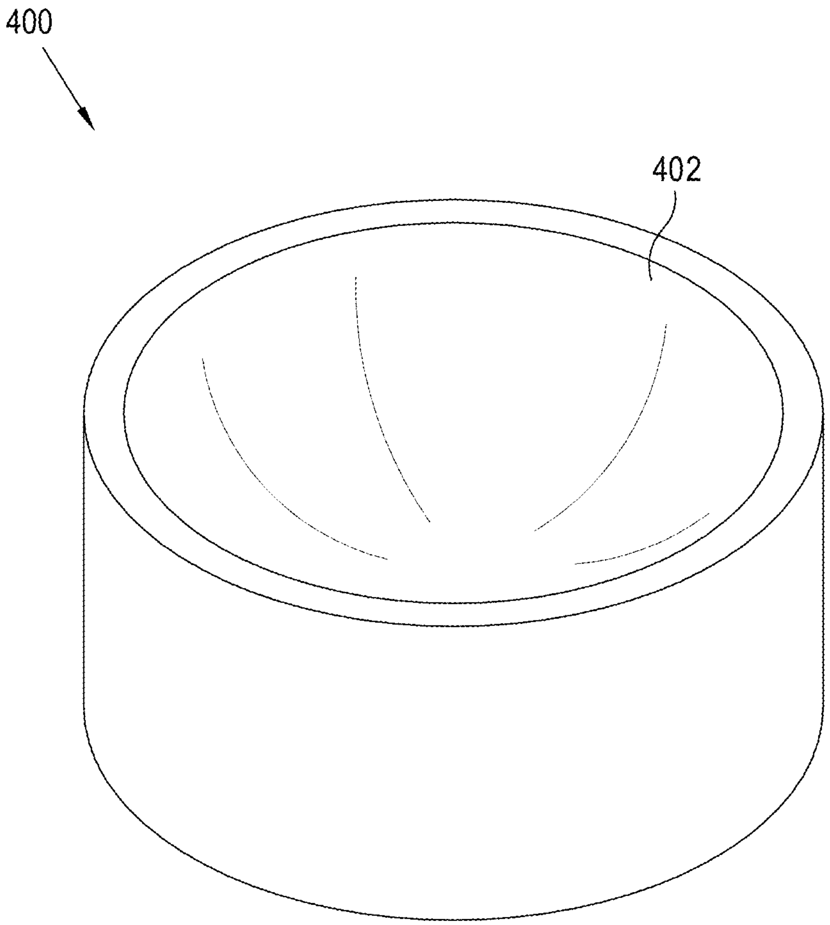
FIG. 2C is a perspective view of the plinth of FIGS. 2A and 2B.
Figure 4A:
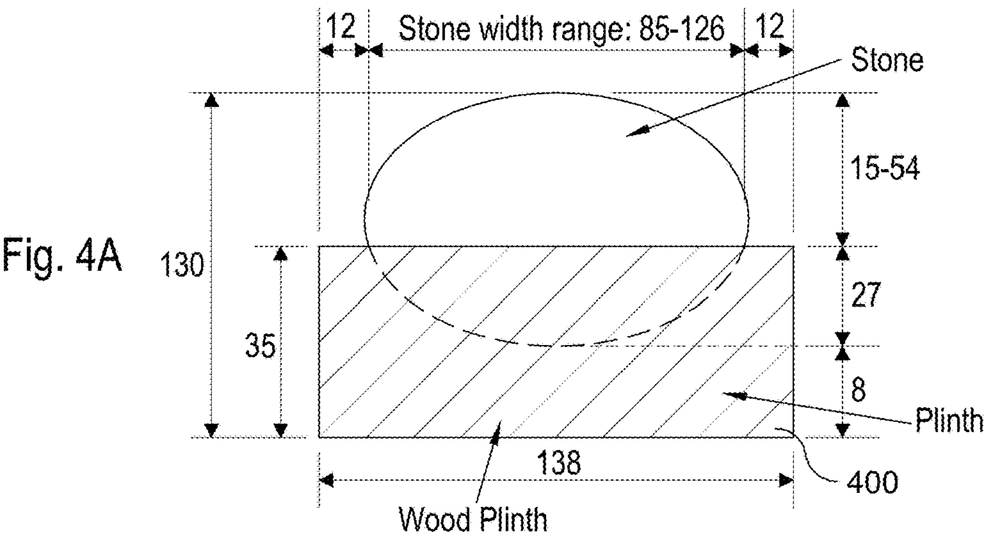
FIG. 4A is a partial side cross-sectional view of the wood plinth of FIG. 2A with a cremation stone placed therein.

FIGS. 2A to 2C and 4A show wooden plinths for carrying and displaying stone 123. Referring to FIGS. 2A, 2B, and 4A, plinth 400 has a wooden frame base having an indentation or receiving bay 402 configured to receive almost half a single cremation stone therein. Preferably, plinth 400 has a height of around 35 mm and a diameter of 138 mm. Receiving bay 402 has an internal diameter of around 112 mm, and a depth of around 27 mm. It will be appreciated that the aforementioned dimensions may be altered as best suited for a particular situation. For example, if the plinth has a 138 mm diameter, preferably, the distance between the plinth edge and the edge of a stone is 6 mm.

Figure 3A:
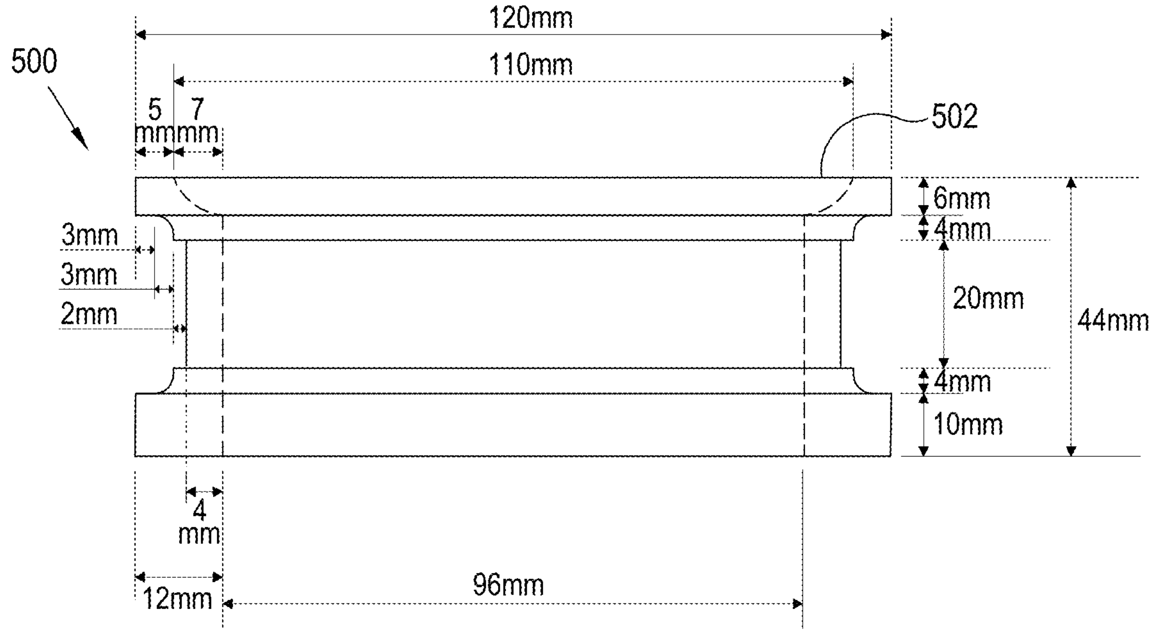
FIG. 3A is a side view of a metallic holder for carrying a cremation stone produced by a method such as illustrated in FIG. 1.
Figure 3B:
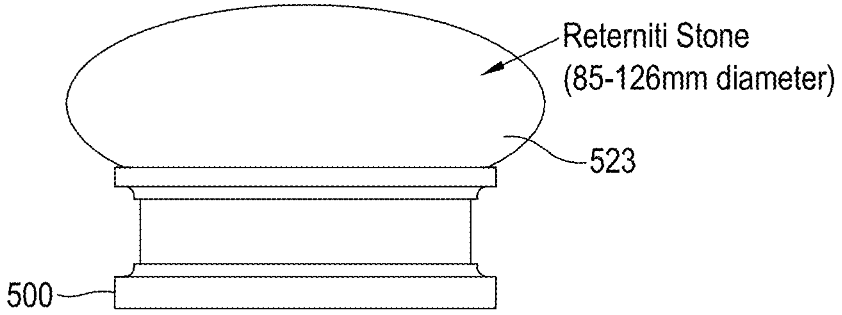
FIG. 3B is a side view of the metallic holder of FIG. 3A, with a cremation stone placed thereon.
Figure 3C:
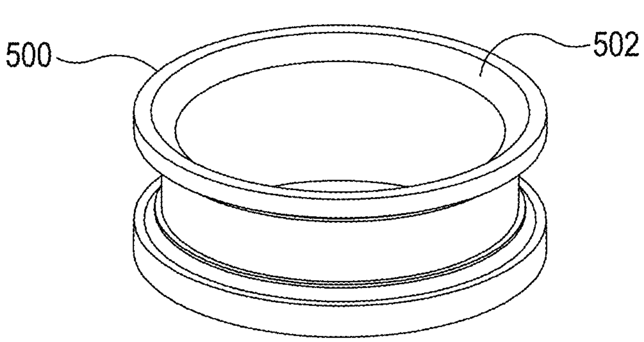
FIG. 3C is a perspective view of the metallic holder of FIG. 3A.

Referring now to FIGS. 3A to 3C, a metal carrier holder 500 is shown. Holder 500 is similar to carrier 400, except that holder 500 is preferably constructed from a metal such as brass, though it will be appreciated that other artificial materials may be used, such as stainless steel, aluminium, or even a carbon fibre composite. Preferably, holder 500 has a maximum outer diameter of around 120 mm, a maximum internal diameter of around 110 mm, and a minimum internal diameter of around 96 mm. FIG. 3B shows a cremation stone 523 placed into a receiving bay 502 (FIG. 3A).

Figure 4B:
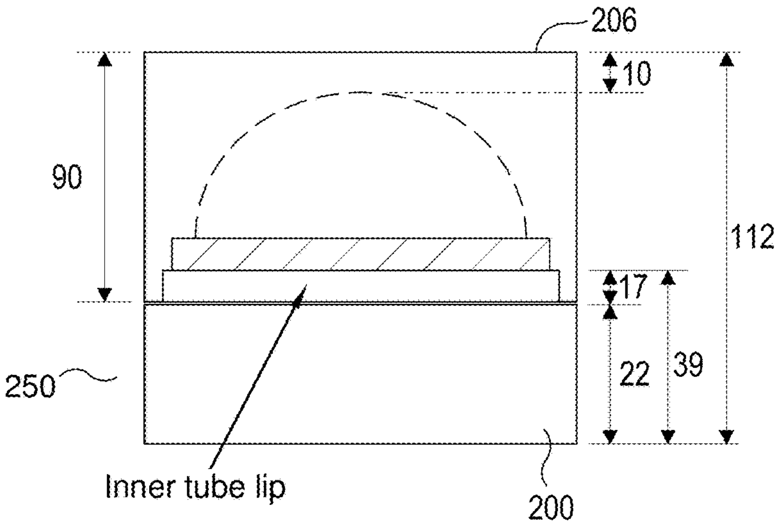
FIG. 4B is a partial side cross-sectional view of the wood plinth and stone of FIG. 4A configured as an outer two-part presentation tube box with a cover attached.
Figure 4C:
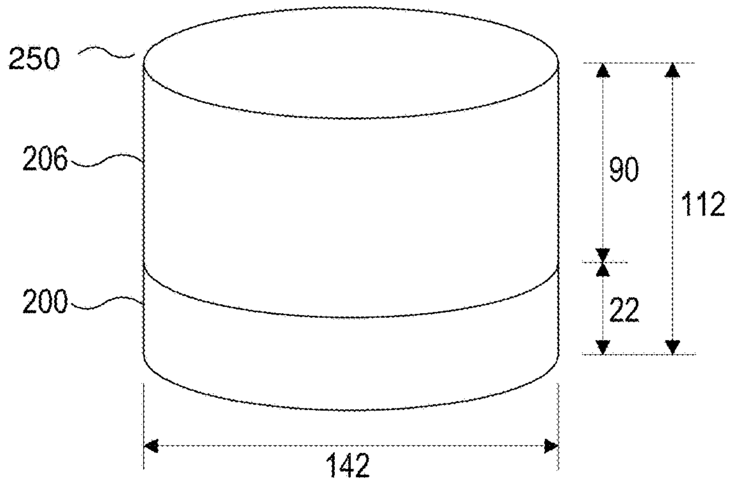
FIG. 4C is a perspective view of the outer two-part presentation tube box which encapsulates both the plinth and cremation stone of FIG. 4B.

FIGS. 4B to 4C show a plinth 250 configuration useable within its outer presentation & transportation box-a cylindrical two part cardboard tube box, the base being shown as 200. Plinth configuration 250 sits within tube box base 200. The tube box lid 206 may be placed over the top edge of tube box base 200. Preferably, tube box lid 206 has a height sufficient to accommodate an average height of a stone placed in the carrier.

Figure 5:
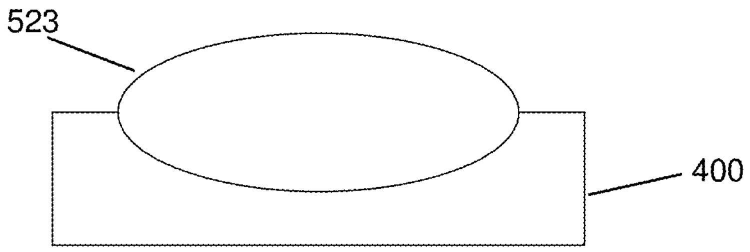
FIG. 5 is a perspective view of a plinth for carrying a smaller-sized elliptical cremation stone produced by a method such as illustrated in FIG. 1.

FIG. 5 shows plinth 400 adapted and configured to accommodate a smaller size and volume elliptical stone 523 (FIG. 3B) therein. Stone 523 is generally more elliptical, having a reduced height more conducive for storage and intended for smaller animals or portions of humans.

Figure 6:
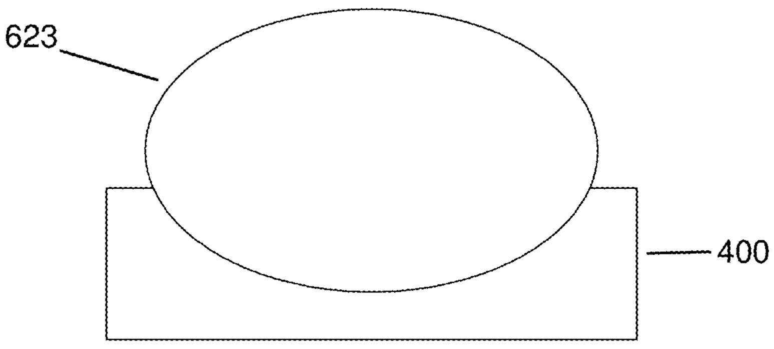
FIG. 6 is a perspective view of a plinth for carrying a less-elliptical, more rounded larger-sized cremation stone produced by a method such as illustrated in FIG. 1.

FIG. 6 shows plinth 400 configured for use with a larger volume more circular stone 623. Stone 623 is larger to accommodate more mass, such as human remains compared to the amount of mass typically encountered for most animal remains.

Figure 7:
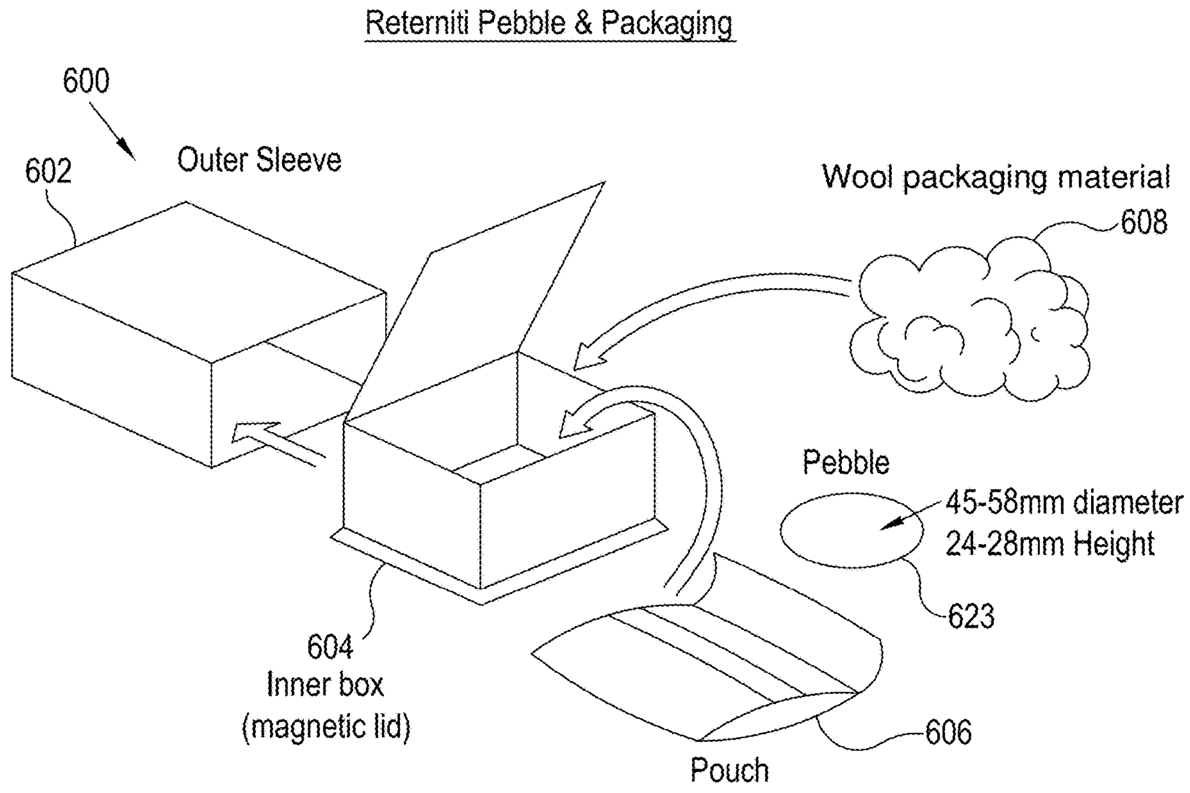
FIG. 7 is an expanded perspective view of a preferred method for packing a very small cremation stone produced by a method such as illustrated in FIG. 1.

Referring now to FIG. 7, preferred packaging material is shown, and referred to by reference number 600. Packaging 600 includes an outer sleeve 602, preferably made of cardboard. Presentation box 604 is dimensioned to fit within sleeve 602. Box 604 preferably has a magnetic lid for securely closing the lid. Stone 623 known as a "Pebble," preferably formed by method 100, may be placed in a velvet carrying pouch 606 for insertion into box 604. Thereafter, packing material 608, such as wood, paper wool, or other protective filler, is stuffed around the stone to help protect it from damage.

Preferred dimensions are set forth below, although it will be appreciated that the dimensions may be varied as suitable for the intended application. A plurality of cremation stones may be formed as pebbles, each in a shape with a maximum diameter in the range of 40-60 mm. Stones for carrying the remains of a pet may be produced as a single stone with a diameter in the range of 60-120 mm. Stones for carrying the remains of a human may be formed as a single large stone in a general ellipsoid shape having a maximum diameter of 120-200 mm. Weights can range from 50 g to 4.2 Kg, depending on the size and carrying contents.

The ranges described above may include a subset of ranges therein without departing from the scope of the present disclosure. It will be appreciated that these dimensions are representative only and may be varied as appropriate.

Preferably, the stone is formed as a solid stone without any cavities. The absence of cavities may be facilitated by one or more of the vibration steps to get rid of any bubbles in the mixture. The forming of the stone is preferably without any heat. The foregoing description is by way of example only, and may be varied considerably without departing from the scope of the present disclosure. For example only, a heating step may be added if desired.

The number, placement, shape and capacity of the cremation stone(s) may be varied without departing from the scope of the disclosure. For example, instead of a single, large cremation stone, a plurality of smaller cremation stones may be produced as desired depending upon the intended use and situation. Preferably, the stone is produced without one or more of the following: a resin, iron oxide, ion powder, and/or PVC plastic fibres. Preferably, the stone is simply shaped (e.g., not in human or animal shape) to minimise risk of breakage. The mixture is preferably composed of 70-80% of human or animal ash, which permits much of the cremated animal or human to be in the stone, while reducing product weight (permitting easier storage or display). A name, date, and/or special wording or phrase may be etched into the finished product once produced.

The features described with respect to one embodiment may be applied to other embodiments, or combined with or interchanged with the features of other embodiments, as appropriate, without departing from the scope of the present disclosure.

The present disclosure in a preferred form provides the advantages of an enhanced robust/durable structure not available in stones or carriers produced in the prior art. One or more additional advantages include a more efficient and cost-effective way of producing a cremation stone or carrier.

Other embodiments of the disclosure will be apparent to those skilled in the art from consideration of the specification and practice of forms of the embodiments disclosed herein. It is intended that the specification and examples be considered as exemplary only, with a true scope and spirit of the disclosure being indicated by the following claims.

What is claimed is:

1. A method of producing a solid cremation stone, comprising:

collecting ashes from cremated animal remains;

mixing the ashes with water and at least one binder in a predetermined ratio to produce a mixture;

pouring the mixture into a mould;

drying the mixture while in the mould to produce the solid stone;

creating and applying a slurry to fill surface deviations on the stone after the mixture is dried; and sanding the stone when dried to smooth a surface of the stone.

2. The method of claim 1, further comprising vibrating the mould to minimize bubbles.

3. The method of claim 1, further comprising:

coating the stone with a sealer;

drying the sealer once the stone is coated; and applying at least one coat of lacquer to the stone.

4. The method of claim 1, further comprising laser etching the surface of the solid stone.

5. The method of claim 1, wherein the cremated animal remains are derived from a human.

6. The method of claim 1, wherein the binder is selected from either a biopolymer and synthetic fiber.

7. The method of claim 6, wherein the biopolymer is selected from one of calcium or sodium alginate.

8. The method of claim 1, where the binder includes at least one of silica, pozzolanic and white Portland cement.

9. The method of claim 1, further comprising grinding the ashes from the cremated animal remains before mixing the ashes with water.

* * * * *